T. MACFARLANE
Process of Preparing Chlorine, Bleaching Powder, Carbonate of Soda, &c.
No. 49,597. 3 Sheets—Sheet 1.
Patented Aug. 22, 1865.
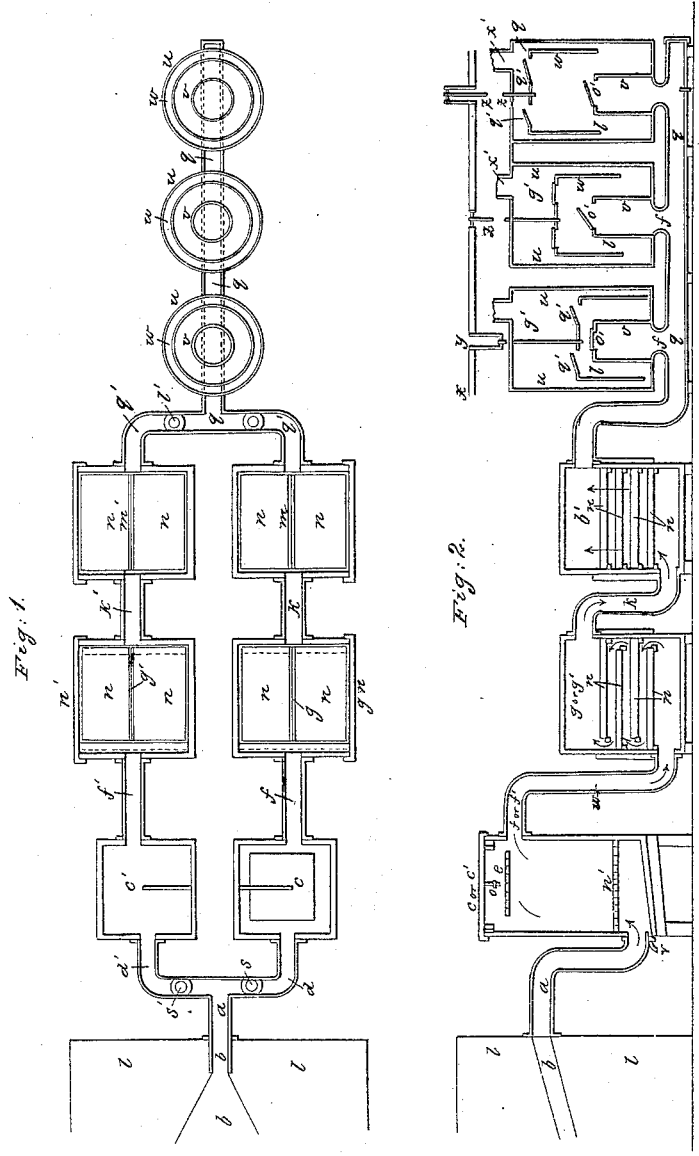
Witnesses:
Geo. W. C. Clarke
David J. Howe
Inventor:
N. Ames.
Attorney for
Thomas Macfarlane.

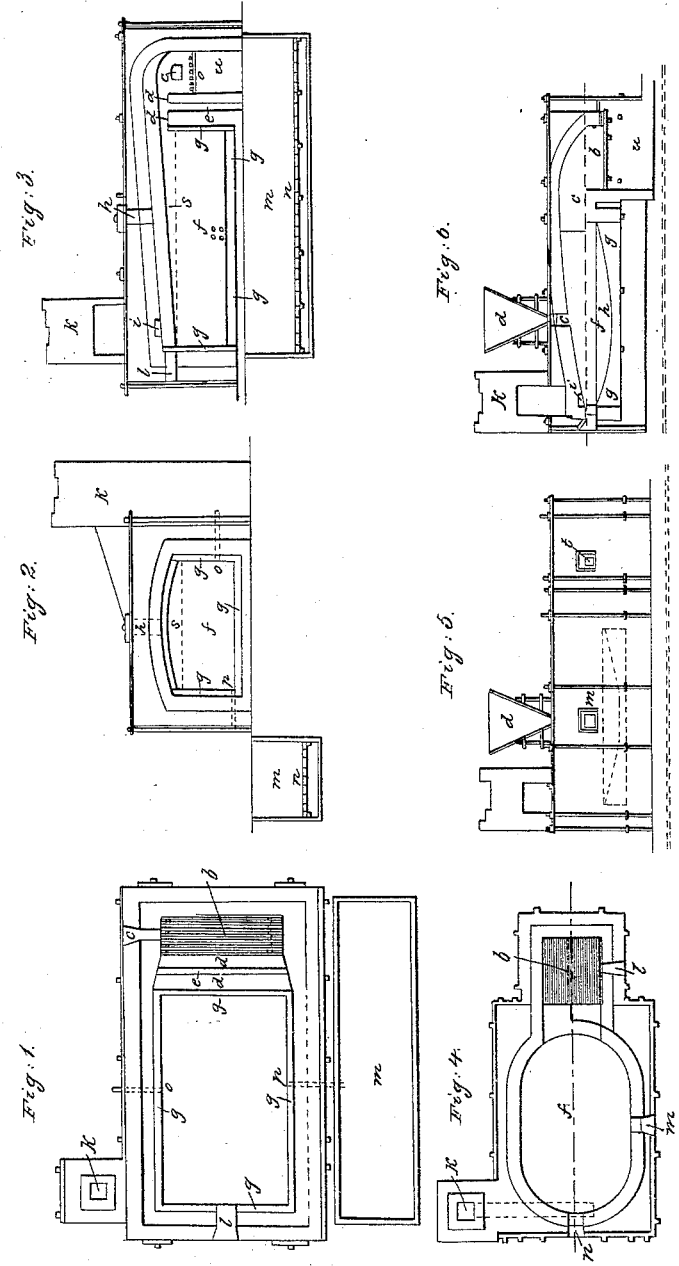

T. MACFARLANE.
Process of Preparing Chlorine, Bleaching Powder, Carbonate of Soda, &c.
No. 49,597.  Patented Aug. 22, 1865.
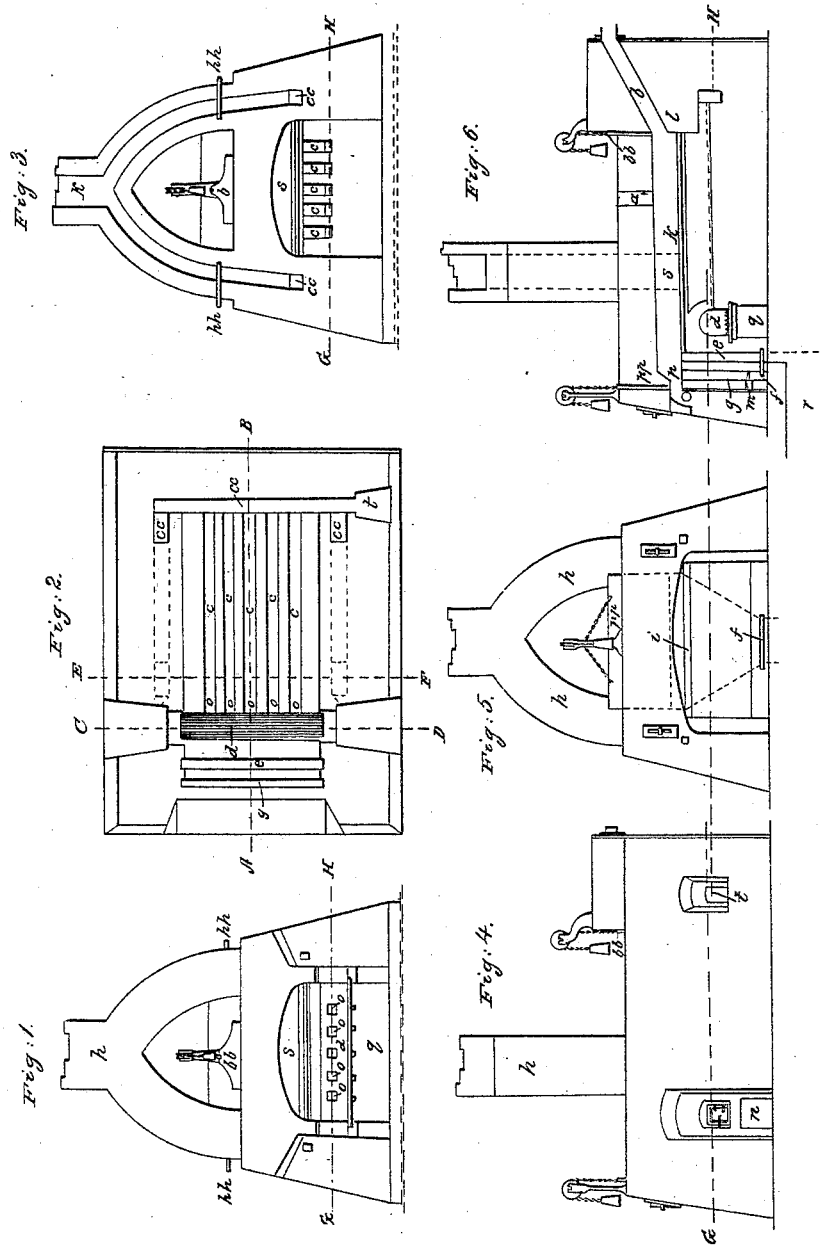

UNITED STATES PATENT OFFICE.

THOMAS MACFARLANE, OF ACTON VALE, CANADA EAST, ASSIGNOR TO HIMSELF, R. LECKIE, AND THOS. S. HUNT, OF SAME PLACE.

IMPROVED PROCESS OF PREPARING CHLORINE, BLEACHING-POWDER, CARBONATE OF SODA, AND OTHER PRODUCTS.

Specification forming part of Letters Patent No. 49,597, dated August 22, 1865.

*To all whom it may concern:*

Be it known that I, THOMAS MACFARLANE, of Acton Vale, in the county of Bagot, Canada East, have invented a new and Improved Process of Manufacturing Chlorine and Bleaching-Powder, Carbonate of Soda and Soda-Ash, and Sulphate of Soda; and I do hereby declare that the following is a full, clear, and exact description of the same, reference being had to the accompanying drawings, forming a part of this specification.

To enable others skilled in the art to apply my process, I will now proceed to describe the nature and practical working of the same.

I take common crystallized green vitriol (obtained either by the ordinary methods or in the manner hereinafter to be described) and heat the same until it loses the water which it contains and becomes more or less oxidized without losing any sulphuric acid. I reduce the calcined green vitriol thus obtained to fine powder, and mix six hundredweight of it with four and a half hundredweight of common salt (previously heated until it no longer decrepitates, and ground to fine powder) and one and a half hundredweight of peroxide of iron, (which may be readily obtained by calcining pure iron pyrites with five per cent. of common salt and lixiviating the result, or by any of the usual methods.) These ingredients, in fine powder, being intimately incorporated with each other, I introduce them into a muffle calcining-furnace of the construction shown in the first sheet of drawings accompanying this specification.

In said sheet, Figure 2 is a horizontal section of the furnace at the line G H, above the level of the flues which are carried underneath the hearth of the furnace. Fig. 6 is a longitudinal section at the line A B in Fig. 2. Fig. 1 is a transverse section at the line C D. Fig. 3 is a transverse section at the line E F. Fig. 5 is an end elevation of the furnace at the place where it is worked. Fig. 4 is a side elevation.

On these figures the letters denote as follows:

$a$ is the opening on the roof of the furnace through which the materials to be calcined are introduced.

$b$ is the opening in the back wall of the furnace through which the products of the calcination are drawn off. This opening is provided with a damper, $b\ b$.

$c$ represents the flues through which the flame from the grate $d$ is conducted under the hearth of the furnace. These flues stand in connection with the flues $c\ c$ and chimney $h$, (supplied with the dampers $h\ h$,) through which the smoke and flame escape.

$t$ is a door to the flue $c\ c$, in order that the same, as well as the flues $c$, may be cleaned.

$d$ is the grate, into which the fuel is introduced from both sides of the furnace. It stands in communication with the flues $c$ through the flame-holes $o$.

$e$ is a slit in the end wall of the furnace nearest the working side, which serves to receive the calcined product on its being withdrawn from the furnace and to carry it into the receptacle $r$ beneath. The slit $e$ is furnished with a damper, $f$.

$g$ is another slit in the same wall, supplied with a grating, $m$, and constantly filled with quicklime or other hydrometric substance, which, as it falls through the grating, is removed through the opening $n$ in the outer wall on the working side.

$i$ is an iron roller, on which a rake for stirring the mixture is laid and worked.

$k$ is the calcining-hearth, which rises a little towards the back wall, $l$, and consists of a double layer of fire-clay plaster two inches thick. The plates of the inferior layer are furnished with a check, so that they can be accurately fitted into each other. Upon this the second layer of plates, which do not require to be checked, is laid. The plates of both layers must be brought as close to each other as possible, and the joints carefully filled with fire-clay.

P is the opening through which the furnace is worked, which is supplied with the door $p\ p$; $q$, the ash-pit; $s$, the muffle or space betwixt the hearth and the roof.

The mixture above referred to is introduced through the opening $a$ and falls on the hearth of the furnace, previously heated to faint redness by the fire on the grate $d$. By means of a rake introduced and worked through the opening P it is spread over the hearth, after which the rake is withdrawn and the opening P closed by lowering the door $p\ p$.

That part of the furnace over the hearth, (marked $s$,) which may be called the "muffle," and to which the flame or products of combustion of the fuel in *d* have no access, is connected with an exhausting-machine, which draws a current of air through the quicklime contained in the slit *e* and over the mixture which is spread out on the hearth of the furnace. Double decomposition takes place at a very low temperature between the calcined green vitrol and the salt, sulphate of soda resulting on the one hand and protochloride of iron on the other. The temperature in the muffle is so low that neither of the chlorides of iron is sublimed; but, on the other hand, the oxygen contained in the dry air passing over the mixture decomposes both into peroxide of iron, which remains, and chlorine gas, which is drawn off by the exhausting-machine. It is of the utmost importance in this operation that the temperature be kept at a low red-heat, because, as is well known, calcined green vitriol and common salt, ignited together at a higher temperature, fuse and emit fumes of perchloride of iron. In order to produce pure chlorine the mixture must not be allowed to fuse or even to sinter. The peroxide of iron used as one of the ingredients has some influence in preventing sintering and eliminating the chlorine. The greater the quantity of peroxide of iron used the easier it is to calcine the mixture without permitting it to cake together. I have not, however, found it necessary to use more of it than the proportion above stated when the calcination is performed with proper care. During the operation the materials are quickly but frequently stirred with the rake, and this also prevents sintering. The door at *p* must always be kept closed, unless when the mixture is being stirred, and the exhausting-machine above mentioned must, of course, be kept in motion during the whole operation.

This exhausting-machine and other apparatus connected with it are shown in Sheet II of the drawings accompanying this specification.

In Sheet II, Fig. 1 is a horizontal section of the apparatus at the line A B in the vertical section, Fig. 2.

On these figures the letters denote as follows:

*l* is back wall of furnace, and *b* opening leading from muffle of same; *a*, iron pipe joining the opening *b* and leading to the two purifiers *c* and *c'* through the branches *d* and *d'*. These branches are provided with the stop-cocks *s* and *s'*, one of which only is kept open at a time and the other shut. The purifiers *c* and *c'* are wooden boxes lined with lead and furnished with lids having water-joints. They are also supplied with perforated bottoms *n'*, upon which rests a layer of coke about four feet thick. This coke is during the operation kept moist by water, which is introduced at the cock *o*, and falls on the perforated shelf *e*, which distributes it over the surface of the coke, through which it percolates, and finally is run off at the cock *v*.

*f* and *f'* are pipes leading from the purifiers into the absorbing-boxes *g g'*, each of which contains four tiers of wooden drawers with perforated bottoms, and filled with slaked lime for absorbing the chlorine. The drawers, of which there are two in each tier, are a few inches shorter than the box in which they are placed, and they are placed so that the current of chlorine, &c., passes underneath, round their ends, and over them in the direction shown by the arrows. The boxes are furnished with the doors *h* and *h'* at the sides, which, when opened, fall down, and when closed are secured by means of cramps.

*k* and *k'* are pipes leading into another pair of absorbing-boxes, *m* and *m'*. These are not so broad as those marked *g* and *g'*, and the drawers *n* fit closely into them. They are furnished with doors at their sides in the same manner as the boxes *g* and *g'*.

*q* is an iron pipe leading from the second pair of absorbing-boxes into the exhausting-machine. This pipe is, like *a*, supplied with two stop-cocks, *t t'*.

The exhausting-machine consists of a series of three cylinders, *u*, containing the smaller cylinders *v*, which communicate with the aforesaid pipe *q*. The space betwixt the inner and outer cylinders up to the level *l* is filled with water. In this water the three movable cylinders *w* move up and down. These are set in motion by the shaft *x*, the cranks *y*, and the rods *z*. When the cylinders rise the valves *q'* close and the valves *o'* open. When they descend the reverse takes place, and the air is forced out of the movable cylinders into those marked *u*, from which it escapes at *x'*.

The furnace being worked, the cylinders in motion, and the stop-cocks *s'* and *t'* closed and those marked *s* and *t* opened, the current of gas from the furnace is drawn through the apparatus in the direction shown by the arrows. The chlorine produced in the muffle of the furnace in the manner above described is first drawn through the coke in the purifier *c*, where it comes in contact with the water, which absorbs any traces of muriatic-acid gas which it may contain. It then passes over the lime contained in the drawers *n* of the box *g*, and the most of it is absorbed by the lime, bleaching-powder being formed. Any portion of chlorine which may remain free after the passage through *g* is absorbed by the slaked lime in the drawers *n* of the box *m*. The gas being in this case drawn through the holes in the bottom of the drawer and up through the lime contained in them, every trace of chlorine contained in it is absorbed, and there pass through the exhausting-machine and out at *x'* only the constituents of the atmosphere which entered the furnace, in so far as they have not been absorbed by the materials calcined in the muffle. As soon as the mixture in the furnace no longer evolves chlorine (which may be known by withdrawing a portion at *p* and smelling it) the exhausting-machine is stopped, the damper at *b b* closed, the door *f* withdrawn, and the contents of the furnace drawn into the slit $c$, through which it falls into the receptacle beneath. This residue consists of about six hundred pounds sulphate of soda and five hundred pounds peroxide of iron, provided the quantities above mentioned have been used. A fresh quantity of mixture is then introduced into the furnace, the cocks $s'$ and $t'$ opened and those marked $s$ and $t$ closed, in order that the products from the furnace may be drawn through the other set of purifiers and absorbing-boxes. The damper $b\ b$ is then opened, the exhausting-machine set in motion, and the same process as that already described repeated. While the one set of absorbing-boxes are in use the other set are opened, and the drawers containing the bleaching-powder in box $g$ or $g'$ removed and replaced by those of the box $m$ or $m'$, the lime of which is only partially charged with chlorine. The box $m$ or $m'$ is then filled with drawers containing fresh lime, and the whole is again ready for exposure to the current of chlorine from the furnace. The twelve hundred-weight of original mixture produce six hundred pounds of bleaching-powder.

The production of chlorine and bleaching-powder and of the residual mixture of sulphate of soda and peroxide of iron constitutes the first part of my invention.

I next take the mixture of sulphate of soda and peroxide of iron, resulting as above described, and mix the same with two hundred and fourteen parts of powdered coal or charcoal. I then smelt the mixture in a reverberating smelting-furnace of the construction shown in Figs. 5 and 6 of the third sheet of drawings accompanying this specification.

On these figures the letters denote as follows:

$a$ is an ash-pit; $b$, grate; $c$, fire-bridge; $d$, hopper for containing the mixture to be introduced through $e$ into the furnace; $f$, the cavity for containing the smelted material; $g$, the hearth; $h$, the tap-hole; $i$, the flue leading into the chimney $k$; $l$, furnace-door; $m$, door required for manipulating the tap-hole $h$; $n$, opening for working furnace.

Before the furnace is heated up the hearth $g$ is prepared in the following manner: One hundred parts of quicklime, ground to powder, are mixed with sixteen parts of basic slag, such as is commonly produced in copper-smelting works, or of any other slag or glass not too difficult of fusion. This mixture is beat into the bottom of the furnace when in a dry state, and the depression $f$ scooped out in it, and the tap-hole $h$ formed through it at the bottom, as is customary in preparing the hearths of furnaces intended for smelting. The furnace is then gradually heated up, and a strong heat continued until the materials of the hearth slightly cake together. As soon as this takes place a mixture of one hundred parts of sulphate of soda and twenty-five parts of powdered coal or charcoal are introduced. This soon fuses and is totally absorbed by the hearth. More of the same mixture of sulphate of soda and coal is then introduced, and the introduction of this mixture continued until no more of the resulting sulphuret of sodium is absorbed by the hearth. The furnace is then kept at a red heat, and is ready to receive the mixture of sulphate of soda, peroxide of iron, and charcoal or coal already referred to. For the furnace above described a charge consists of about forty hundredweight of the mixture. Very soon after its introduction it begins to fuse and emit jets of yellow flame. After it has been properly stirred up it enters into quick fusion, and is let off at the tap-hole $h$ and run into iron molds, in which it solidifies in large blocks. It is totally without corroding action in the hearth, and an almost unlimited number of charges may be smelted down in it without the hearth's being much affected. On the contrary, it becomes and remains hard and compact, and can only with difficulty be taken out of the furnace. These blocks of smelted material, which contain sulphur, sodium, and iron, are immediately broken up and introduced into water contained in a boiler similar to that used for evaporating alkaline solutions in the ordinary method for manufacturing soda, and in which the flame and products of combustion pass over the surface of the solution.

Figs. 1, 2, and 3 of the third sheet of drawings accompanying this specification represent, respectively, a horizontal, cross, and longitudinal section of this furnace, in which figures the letters denote as follows:

$a$ is an ash-pit; $b$, grate; $c$, furnace-door; $d$, fire-bridges; $e$, slit in the fire-wall to prevent the heat from affecting the leaden pan $r$, which is covered with the brick lining $q$; $f$, space occupied by solution and residue; $h$, opening for introducing the smelted blocks and water; $i$, flue leading to the chimney $k$; $l$, working-door; $m$, box for receiving insoluble residue from furnace; $n$, perforated bottom; $o$, pipe for leading off alkaline solution; $p$, pipe for leading off insoluble residue; $s$, level to which the solution may rise in the space $f$.

On the introduction of the smelted material into the water it is partially dissolved, and the solution assumes a deep-greenish-black color from dissolved sulphuret of iron. When, however, heat is applied to the solution and the flame, as well as the carbonic acid produced in the combustion of the fuel, is passed over it, the latter gas is absorbed, the solution gradually becomes decolorized, and consists almost solely of a solution of carbonate of soda. In the event of the solution's being too much evaporated before the decolorization is effected, water is added and the heating and exposure to the products of combustion continued. During this operation the insoluble sulphuret of iron remains at the bottom of the boiler. When the supernatant solution has become colorless the fire in the grate $b$ is slackened and the contents of the boiler allowed to settle. The clear liquid is then drawn off through the pipe $o$ and fresh water introduced among the insoluble sulphuret of iron. If this solution also becomes green, it is decolorized in the same manner as the first solution. The second solution is drawn off in the same manner as the first and the same operation repeated with fresh water until the latter dissolves no more soda from the sulphuret of iron. The first and more concentrated solutions thus obtained are evaporated and allowed to crystallize, when carbonate of soda in crystals separates, the mother-liquor from which may be evaporated to dryness in order to the production of soda-ash. The weaker solutions obtained latterly from the sulphuret are used for treating fresh quantities of smelted material from the furnace. The sulphuret of iron which remains after having been thus repeatedly treated with water is run off through the pipe $p$ into the box $m$, over the perforated bottom of which a coarse cloth is spread. It here becomes drained of the water it contains, and on being removed from the box is ready for being treated in the manner yet to be described.

The production of carbonate of soda and of soda-ash and of insoluble sulphuret of iron in the manner above described constitutes the second part of my invention.

The insoluble sulphuret of iron obtained as above described, and which is still in a moist state, I expose in considerable quantities, but with as much surface exposed as possible, to the action of the atmosphere and of moisture. It is exposed on a perforated wooden floor covered with coarse gravel, on which a layer of fine gravel and then sand is placed, said floor being supported over an impervious bottom of clay or other material, so inclined and arranged that the solution obtained in lixiviating the mass may be conveniently collected for further treatment. The moist sulphuret rapidly oxidizes, and, passing through various intermediate stages of oxidation, it ultimately becomes very rich in sulphate of iron. It must never be allowed to oxidize so rapidly as to enter into combination, because in that case sulphurous acid is produced, which would escape as gas and be lost. This tendency to oxidize too rapidly may be counteracted by keeping the mass moist. When a sufficient quantity of sulphate of iron has been formed in the mass, hot water is poured over its whole surface, which, percolating through it, dissolves the sulphate, and, falling on the impervious floor beneath, is gathered up in canals prepared for it, and finally collected in a large reservoir. The solution thus obtained is concentrated in boilers of the same description as those used for a similar purpose in copperas-works, and crystals of green vitriol obtained in the manner usually adopted in those establishments. The exposure and lixiviation of the sulphurets are continued and repeated until a residue is left consisting of peroxide of iron and containing little or no sulphur. The green vitriol obtained as above described is used in the first part of my invention and the residue of peroxide of iron, if sufficiently pure, may also be used in that operation.

The production of sulphate of iron in the manner above described from the sulphuret of iron resulting in the former process constitutes the third and last part of my invention.

Having thus described the nature of my invention, I proceed to advert to the advantages which it possesses over the ordinary methods for producing bleaching-powder and soda. These, as at present pursued, comprise the following processes: First, the manufacture of sulphuric acid from iron pyrites or sulphur by the action of nitrous acid and oxygen of the atmosphere admitted into the leaden chamber, in which nitrous acid is produced by the action of sulphuric acid or nitrate of soda; second, the production of muriatic acid and sulphate of soda by the action of sulphuric acid on common salt; third, the production of chlorine (and of bleaching-powder by combining the chlorine with lime) by the action of muriatic acid on peroxide of manganese, in which process, however, only one-half of the chlorine contained in the muriatic acid is evolved as gas, the other half combining with manganese and forming therewith a waste product; fourth, the decomposition of sulphate of soda by igniting it with limestone and charcoal, in which operation the sulphur combines with lime or calcium and forms therewith a waste product; fifth, the extraction of carbonate of soda and soda-ash from the product of this ignition.

With regard to these, the ordinary processes, the following facts are observable, viz: First, the whole of the sulphur contained in the sulphuric acid and one-half of the chlorine contained in the common salt originally used are lost; second, they comprise five distinct processes, some of which—such as the manufacture of sulphuric acid—require very expensive apparatus; third, nitrous acid, peroxide of manganese, and limestone are used in these processes in such a manner as not to be recoverable, or only with great expense and difficulty.

In comparing these processes with my invention it will be observed, first, that by means of the latter the sulphur contained in the sulphuric acid of the green vitriol used in the first operation is recovered, and may be used an indefinite number of times, and that the whole of the chlorine contained in the common salt is evolved as gas and rendered available for the manufacture of bleaching-powder; second, that my invention comprises only four operations—one less than by the ordinary methods—and that these do not require any extraordinarily-expensive apparatus; third, that nitrous acid, peroxide of manganese, and limestone are altogether dispensed with, only one material—peroxide of iron—being used to replace the limestone, but always in such a manner as to be recoverable and used again.

Having thus adverted to the advantages which my invention presents over the ordinary processes, I proceed to remark that I am aware that it has been proposed to manufacture carbonate of soda and soda-ash by mixing together and igniting sulphate of soda, peroxide of iron, and charcoal or coal, exposing the resulting product to a stream of carbonic acid, and thereafter dissolving out the alkaline matters with water, and I wish it to be understood that I do not claim this method of manufacturing carbonate of soda and soda-ash when the same is used alone or in combination with processes other than those above described; but What I do claim, and desire to secure by Letters Patent, is—

1. The production of chlorine by heating a mixture of calcined green vitriol, common salt, and peroxide of iron in a current of air in the manner described, and not only the production of chlorine in this manner, but the use of the chlorine so produced in manufacturing chloride of lime, chlorate of potash, sulphuric and muriatic acids, or in any process in which gaseous chlorine may be advantageously applied.

2. The use of the residue resulting from the production of chlorine from sulphate of iron and common salt, as above described, in the manufacture of carbonate of soda and soda-ash, substantially as described.

3. The use of the refractory mixture of burnt lime and slag for forming the hearths of the furnaces employed in smelting the mixture of sulphate of soda, peroxide of iron, and charcoal or coal, substantially as described.

4. The described method of decolorizing the deep-greenish-colored alkaline solution in the manufacture of carbonate of soda and soda-ash.

5. The production of sulphate of iron from the artificial sulphuret of iron, in the manner substantially as described.

6. The described process for manufacturing carbonate of soda and soda-ash, when the same is combined with the two other parts of my invention, substantially as and for the purpose described.

7. I do not confine myself in carrying out my invention to the particular apparatus described in my specification, as the same object may be practically accomplished by very different apparatus. I therefore claim the use of any equivalent apparatus by means of which my invention may be carried out substantially as described.

THOMAS MACFARLANE.

Witnesses:
S. F. PEARCE,
R. W. WARREN.